(12) United States Patent
Han et al.

(10) Patent No.: US 10,355,902 B2
(45) Date of Patent: Jul. 16, 2019

(54) DEVICE AND METHOD FOR NETWORK INFORMATION ANALYSIS IN WIRELESS COMMUNICATION SYSTEM

(71) Applicant: Samsung Electronics Co., Ltd., Suwon-si, Gyeonggi-do (KR)

(72) Inventors: Kiyoung Han, Yongin-si (KR); Young-Sung Kho, Seongnam-si (KR); Sangheon Lee, Seoul (KR); Yoonil Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/547,333

(22) PCT Filed: Jan. 28, 2016

(86) PCT No.: PCT/KR2016/000912
§ 371 (c)(1),
(2) Date: Jul. 28, 2017

(87) PCT Pub. No.: WO2016/122221
PCT Pub. Date: Aug. 4, 2016

(65) Prior Publication Data
US 2018/0006862 A1 Jan. 4, 2018

(30) Foreign Application Priority Data
Jan. 28, 2015 (KR) ........................ 10-2015-0013580

(51) Int. Cl.
*H04B 7/06* (2006.01)
*H04L 1/18* (2006.01)
(Continued)

(52) U.S. Cl.
CPC ....... *H04L 27/2621* (2013.01); *H04B 7/0632* (2013.01); *H04B 17/327* (2015.01);
(Continued)

(58) Field of Classification Search
CPC combination set(s) only.
See application file for complete search history.

(56) References Cited

U.S. PATENT DOCUMENTS

2011/0170496 A1 7/2011 Fong et al.
2011/0269490 A1 11/2011 Earnshaw et al.
(Continued)

FOREIGN PATENT DOCUMENTS

KR 10-2014-0110506 A 9/2014
KR 20140110506 A * 9/2014
(Continued)

*Primary Examiner* — Wednel Cadeau
(74) *Attorney, Agent, or Firm* — Jefferson IP Law, LLP

(57) ABSTRACT

The present disclosure relates to a network information analysis in a wireless communication system, and an analysis method comprises the steps of: receiving information on channel quality measured by a terminal; and outputting information on whether a carrier aggregation (CA) coverage mismatch occurs at a location where the channel quality has been measured, which is determined on the basis of the information on the channel quality. Further, the present disclosure comprises other embodiments as well as the above-descried embodiment.

16 Claims, 12 Drawing Sheets

(51) Int. Cl.
  *H04L 5/00* (2006.01)
  *H04B 17/21* (2015.01)
  *H04L 27/26* (2006.01)
  *H04W 24/02* (2009.01)
  *H04W 24/04* (2009.01)
  *H04W 24/10* (2009.01)
  *H04B 17/327* (2015.01)

(52) U.S. Cl.
  CPC .......... *H04L 1/1825* (2013.01); *H04L 5/0094* (2013.01); *H04W 24/04* (2013.01); *H04W 24/10* (2013.01); *H04B 17/21* (2015.01); *H04L 5/001* (2013.01); *H04L 5/0053* (2013.01); *H04W 24/02* (2013.01)

(56) References Cited

U.S. PATENT DOCUMENTS

| | | |
|---|---|---|
| 2012/0257524 A1 | 10/2012 | Chen et al. |
| 2014/0003269 A1* | 1/2014 | Golitschek Edler von Elbwart ............ H04L 5/003 370/252 |
| 2014/0024375 A1* | 1/2014 | Fitzpatrick ............ H04W 36/30 455/436 |
| 2014/0106764 A1 | 4/2014 | Huang |

FOREIGN PATENT DOCUMENTS

| | | | | |
|---|---|---|---|---|
| KR | 20140110506 A | * | 9/2014 | |
| WO | WO 2011020344 A1 | * | 2/2011 | ............. H04L 5/001 |
| WO | WO-2011020344 A1 | * | 2/2011 | ............. H04L 5/001 |

* cited by examiner $$S = \begin{bmatrix} S(1,1) & \boxed{S(1,2)} & S(1,3) & S(1,4) & S(1,5) & \ldots \\ S(2,1) & S(2,2) & S(2,3) & \boxed{S(2,4)} & S(2,5) & \ldots \\ S(3,1) & S(3,2) & \boxed{S(3,3)} & S(3,4) & S(3,5) & \ldots \\ S(4,1) & S(4,2) & \boxed{S(4,3)} & S(4,4) & S(4,5) & \ldots \\ \boxed{S(5,1)} & S(5,2) & S(5,3) & S(5,4) & S(5,5) & \ldots \end{bmatrix}$$

$\boxed{\phantom{XX}}$ : MAXIMAL SCORE FOR EACH CARRIER

FIG.6

$$S = \begin{bmatrix} S(1,1) & S(1,2) & S(1,3) & S(1,4) & S(1,5) & \ldots \\ S(2,1) & S(2,2) & S(2,3) & S(2,4) & S(2,5) & \ldots \\ S(3,1) & S(3,2) & S(3,3) & S(3,4) & S(3,5) & \ldots \\ S(4,1) & S(4,2) & S(4,3) & S(4,4) & S(4,5) & \ldots \\ S(5,1) & S(5,2) & S(5,3) & S(5,4) & S(5,5) & \ldots \end{bmatrix}$$

⌐ ⌐ : MAXIMAL SCORE
└ ┘   FOR EACH CARRIER

☐ : SORE LESS THAN
    CONSTANT DIFFERENCE
    WITH MAXIMAL SCORE

FIG.7

DEVICE AND METHOD FOR NETWORK INFORMATION ANALYSIS IN WIRELESS COMMUNICATION SYSTEM

FIELD OF THE INVENTION

The present disclosure relates to a network information analysis in a wireless communication system.

BACKGROUND

With the growth of wireless communication technologies, users can receive the provision of a communication service anytime, anywhere within the coverage of a cellular system. For this, a network provider installs base stations and other network entities as infrastructures, and provides the communication service. At this time, for the sake of efficient service provision, the network provider must collect and manage information on various situations that occur within a network.

One of methods for collecting the information on the network is a drive test scheme. The drive test is a scheme of mounting a user device in a vehicle and driving the vehicle, to measure a phenomenon occurring in the user device within a constant area. However, the drive test has a regional limit in which data is collected only on a route on which the vehicle runs. Also, the drive test generates valuable information through post-processing after the collection of data. That is, the drive test has a burden of post-processing and further, has a drawback in which there is not the real-time of information.

DETAILED DESCRIPTION OF THE INVENTION

Technological Problem

One exemplary embodiment of the present disclosure provides a device and method for efficiently analyzing network information in a wireless communication system.

Another exemplary embodiment of the present disclosure provides a device and method for more delicate network information analysis in a wireless communication system.

A further exemplary embodiment of the present disclosure provides a device and method for analyzing network information on the basis of data provided from terminals in a wireless communication system.

A yet another exemplary embodiment of the present disclosure provides a device and method for determining a carrier aggregation (CA) mismatch area on the basis of data provided from terminals in a wireless communication system.

Means for Solving Problem

A method for network information analysis in a wireless communication system according to an exemplary embodiment of the present disclosure includes the steps of receiving information on channel quality measured by a terminal, and outputting information on whether carrier aggregation (CA) coverage mismatch occurs at a location where the channel quality has been measured, which is determined on the basis of the information on the channel quality.

A device for network information analysis in a wireless communication system according to one exemplary embodiment of the present disclosure includes a communication unit receiving information on channel quality measured by a terminal, and an output unit outputting information on whether CA coverage mismatch occurs at a location where the channel quality has been measured, which is determined on the basis of the information on the channel quality.

Effects of the Invention

Temporally and spatially more accurate network analysis is available using vast data collected from user terminals in a wireless communication system.

BRIEF DESCRIPTION OF THE DRAWINGS

FIG. 6 illustrates one example of a score evaluation result in a wireless communication system according to an exemplary embodiment of the present disclosure.

FIG. 7 illustrates another example of a score evaluation result in a wireless communication system according to an exemplary embodiment of the present disclosure.

BEST MODE FOR EMBODIMENT OF THE INVENTION

The operation principle of the present disclosure is described below in detail with reference to the accompanying drawings. In describing the present disclosure below, a detailed description of related well-known functions or constructions will be omitted when it is determined that a concrete description thereof unnecessarily obscure the gist of the present disclosure. And, the terms described later, which are terms defined considering functions in the present disclosure, may become different in accordance to a user and/or operator's intention, practice or the like. Therefore, the definition thereof will have to be given on the basis of the overall content of the present specification.

Below, the present disclosure describes a technology for analyzing network information in a wireless communication system.

The term denoting a transmission technique used in the following description, the terms denoting network entities, the terms denoting data content and determination metric, etc. are exemplified for description convenience. Accordingly, the present disclosure is not limited to the terms described later, and may use other terms denoting objects having equivalent technological meanings.

The terms ' . . . unit', ' . . . er', etc. used below represent the unit of processing at least one function or operation. This may be implemented as hardware, software, or a combination of hardware and software.

Figure 1:
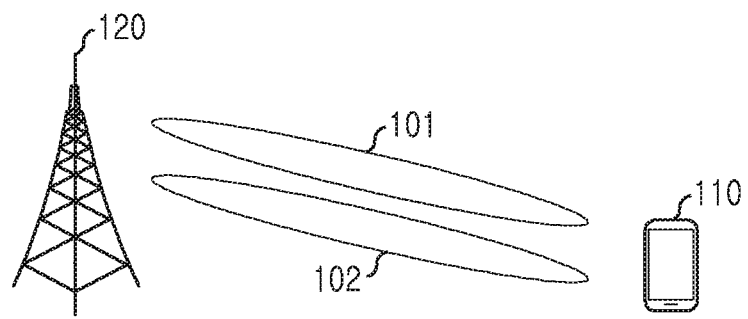
FIG. 1 illustrates the concept of a transmission technique supported in a wireless communication system according to an exemplary embodiment of the present disclosure.

FIG. 1 illustrates the concept of a transmission technique supported in a wireless communication system according to an exemplary embodiment of the present disclosure.

Referring to FIG. 1, communication between a terminal 110 and a base station (BS) 120 is performed. Here, the terminal 110, a user device, has mobility. For example, the terminal 110 may be a portable electronic device, and may be one of a smartphone, a portable terminal, a mobile phone, a mobile pad, a media player, a tablet computer, a handheld computer or a personal digital assistant (PDA). Also, the electronic device may be a device that combines functions of two or more of the aforementioned devices. The base station 120, an infrastructure of a radio access network, provides wireless access to the terminal 110.

The terminal 110 and the base station 120 may perform communication through at least one carrier. In the case of FIG. 1, two carriers 101 and 102 are used. That is, the base station 120 may send a signal to the terminal 110 through a majority of carriers. In the case of FIG. 1, the two carriers 101 and 102 have been exemplified, but three or more carriers may be allocated. One of the two carriers 101 and 102 may be denoted as a primary carrier, and the other one may be denoted as a secondary carrier. To perform communication by the two carriers 101 and 102, two physical layer blocks may be controlled by one media access control (MAC) layer block, within the base station 120. The transmission technique using the majority of carriers as exemplified in FIG. 1 may be denoted as 'carrier aggregation (CA)'. Also, a mode of performing communication using the CA technique may be denoted as a 'CA mode'.

In the case of FIG. 1, two carriers 101 and 102 for CA are provided by the base station 120, i.e., single base station. However, a majority of carriers for the CA may be provided by mutually different base stations. For example, the terminal 110 may operate in a CA mode through the carrier 1 101 of the base station 120 and the carrier 2 102 of another base station. To support the CA between the mutually different base stations, a requirement of a hardware aspect and a requirement of a coverage aspect must be satisfied. Since the CA requires high-speed data exchange between a MAC layer block and a PHY layer block, a very stable and high-speed backhaul connection between the mutually different base stations must be established if the CA between the mutually different base stations is intended to be available. For example, when the mutually different base stations are included in the same hardware unit, the high-speed backhaul connection may be guaranteed. That is, the requirement of the hardware aspect is that high-speed backhaul communication is available, and the requirement of the coverage aspect is to have the overlapped coverage of mutually different carriers. Here, that the backhaul requirement is satisfied may be expressed as 'CA pairing is available' between two base stations, or 'they are in a CA pairing relationship'.

Figure 2:
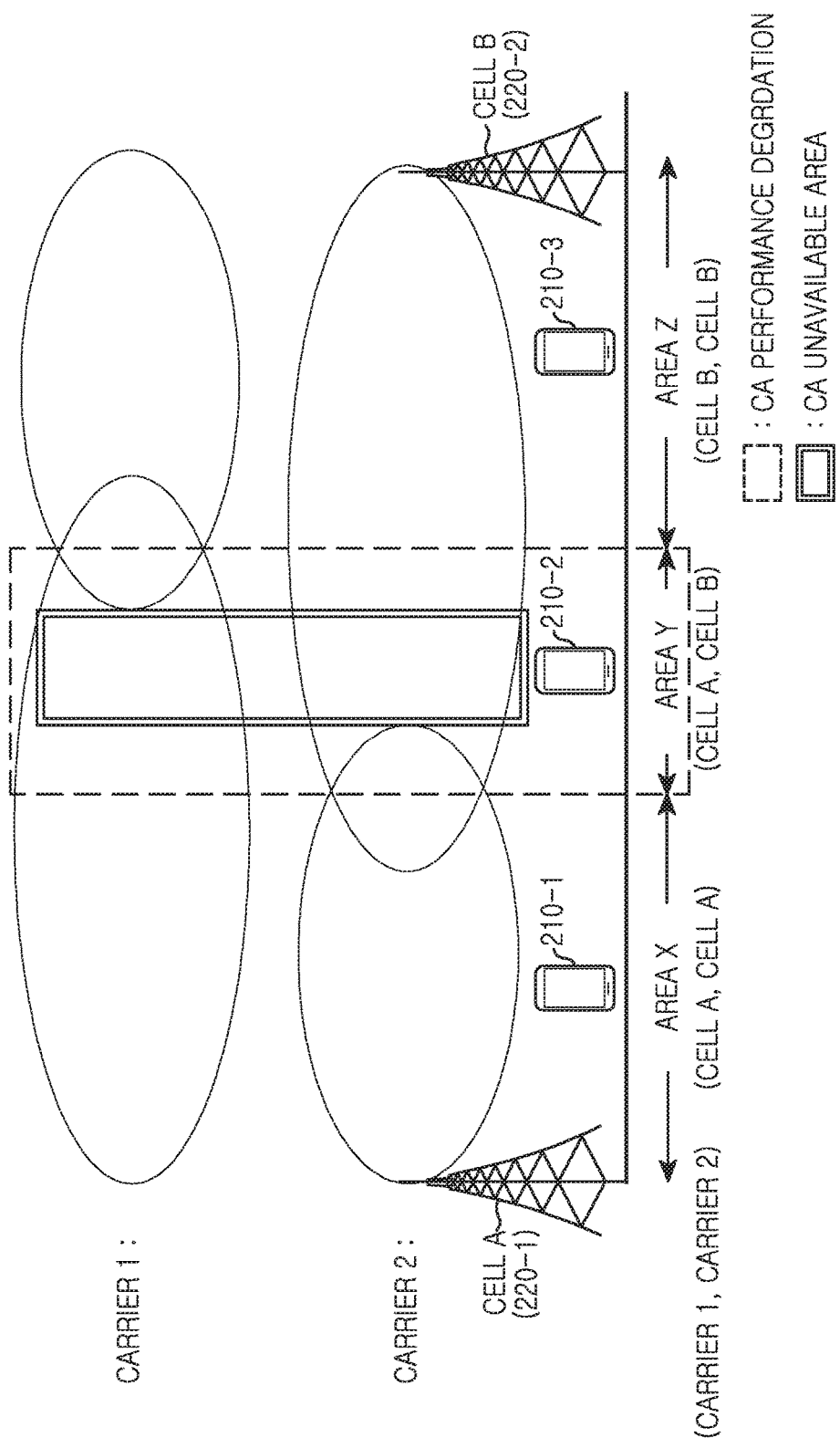
FIG. 2 illustrates an example of whether carrier aggregation (CA) is available according to a location of a terminal in a wireless communication system according to an exemplary embodiment of the present disclosure.

As illustrated in FIG. 1, the base station may support CA, thereby sending a signal to a terminal through a majority of carriers. However, the coverage of each carrier may be mutually different because a majority of carriers occupy mutually different frequencies. Accordingly, the CA may be unavailable or exhibit performance worse than expectation in accordance with a location of the terminal. FIG. 2 below exemplifies a case in which the CA is unavailable or performance degraded.

FIG. 2 illustrates an example of CA availability or non-availability according to a location of a terminal in a wireless communication system according to an exemplary embodiment of the present disclosure. FIG. 2 exemplifies CA support or non-support according to locations of terminals 210-1, 210-2 and 210-3 between two cells 220-1 and 220-2.

Referring to FIG. 2, the cell A 220-1 and the cell B 220-2 may each use two carriers, that is, a carrier 1 and a carrier 2. In the case of the cell A 220-1, the coverage of the carrier 1 is wider than the coverage of the carrier 2. Accordingly to this, an area X adjacent to the cell A 220-1 belongs to the common coverage of the carrier 1 of the cell A 220-1 and the carrier 2 thereof. Accordingly, the terminal 210-1 located in the area X may operate in a CA mode that uses the carrier 1 of the cell A 220-1 and the carrier 2 thereof. On the other hand, in the case of the cell B 220-2, the coverage of the carrier 2 is wider than the coverage of the carrier 1. Accordingly to this, an area Z adjacent to the cell B 220-2 belongs to the common coverage of the carrier 1 of the cell B 220-2 and the carrier 2 thereof. Accordingly, the terminal 210-3 located in the area Z may operate in a CA mode that uses the carrier 1 of the cell B 220-2 and the carrier 2 thereof.

If taking a look at an area Y, the area Y belongs to the coverage of the carrier 1 of the cell A 220-1, but belongs to a coverage boundary of the carrier 2 of the cell A 220-1 or the outside thereof. Also, the area Y belongs to the coverage of the carrier 2 of the cell B 220-2, but belongs to a coverage boundary of the carrier 1 of the cell B 220-2 or the outside thereof. Accordingly, the terminal 210-2 located in the area Y cannot smoothly receive the provision of a CA service even from any cell among the cell A 220-1 and the cell B 220-2. That is, the area Y is a CA coverage mismatch area. Particularly, in the case of an area belonging to the outside of the carrier 2 of the cell A 220-1 and belonging to the outside of the carrier 1 of the cell B 220-2 among the area Y, the terminal 210-2 is located within the coverage of the carrier 1 of the cell A 220-1 and the coverage of the carrier 2 of the cell B 220-2. Accordingly, in the area belonging to the outside of the carrier 2 of the cell A 220-1 and belonging to the outside of the carrier 1 of the cell B 220-2 among the area Y, the CA service is unavailable if CA pairing between the cell A 220-1 and the cell B 220-2 is not supported.

Figure 3:
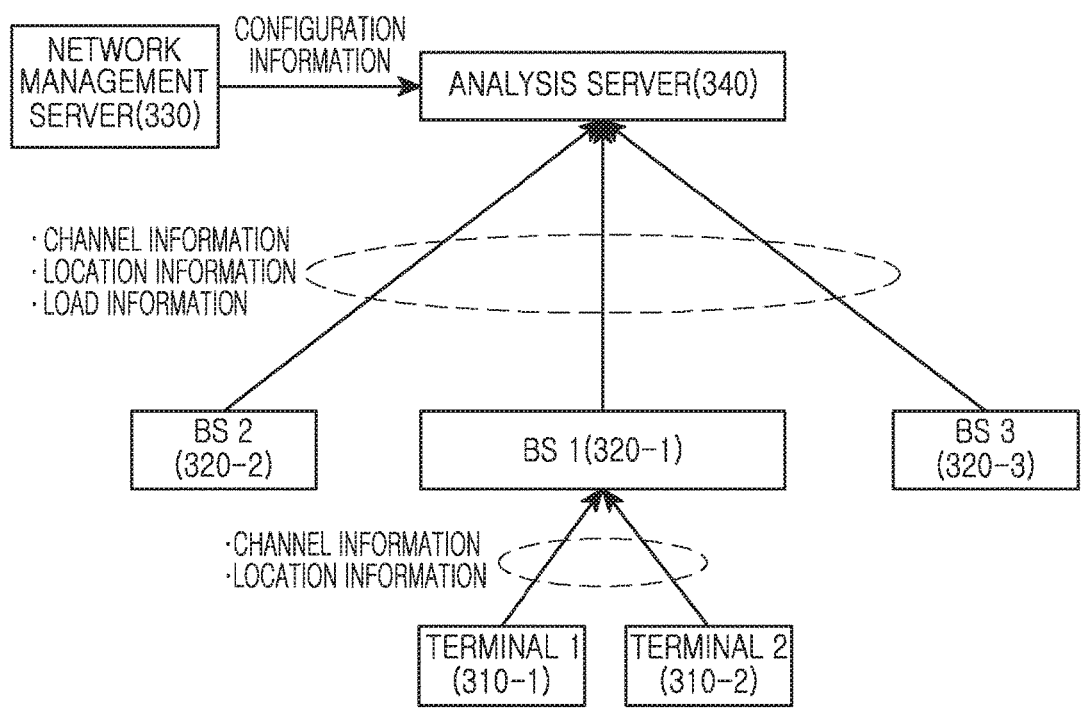
FIG. 3 illustrates a relationship between entities in a wireless communication system according to an exemplary embodiment of the present disclosure.

FIG. 3 illustrates a relationship between entities in a wireless communication system according to an exemplary embodiment of the present disclosure.

Referring to FIG. 3, the wireless communication system includes terminals 310-1 and 310-2, base stations 320-1, 320-2 and/or 320-3, a network management server 330, and/or an analysis server 340.

The terminals 310-1 and 310-2 are user devices. The terminals 310-1 and 310-2 may be one of the terminal 110 of FIG. 1 and the terminals 220-1, 220-2 and/or 220-3 of FIG. 2. That is, the terminals 310-1 and 310-2 may get radio access to one of the base stations 320-1, 320-2 and/or 320-3.

And, the terminals 310-1 and 310-2 may perform communication in a CA mode with at least one of the base stations 320-1, 320-2 and/or 320-3.

The base stations 320-1, 320-2 and/or 320-3 are infrastructures that provide radio access to the terminals 310-1 and 310-2. The base stations 320-1, 320-2, and/or 320-3 each have at least one coverage including a constant geographical coverage. The base stations 320-1, 320-2, and/or 320-3 each use at least one carrier. The coverage may be different according to a carrier, that is, a frequency. The base stations 320-1, 320-2 and/or 320-3 may not mutually have a CA pairing relationship, or may all have the CA pairing relationship, or only some may have the CA pairing relationship.

The network management server 330 is a device for monitoring or controlling, by a network provider, entities (e.g., the base stations 320-1, 320-2 and/or 320-3) configuring a radio access network. The network provider may manage information on the radio access network through the network management server 330, and change setting of the respective entities. For example, the information on the radio access network may include configuration information. The configuration information, which is on a base station, an antenna and/or CA, may be denoted as configuration management (CM) information. The configuration information on the CA includes information on whether CA pairing between respective cells has been made, in other words, whether a backhaul requirement guaranteeing a data rate of a threshold value or more is satisfied. The network management server 330 may be denoted as an element management system (EMS).

The analysis server 340 analyzes network information. On the basis of data provided from the base stations 320-1, 320-2 and/or 320-3, the analysis server 340 analyzes network information, particularly, whether CA coverage mismatch occurs. That is, the analysis server 340 may determine whether CA mismatch for a location of each user device occurs, on the basis of big data that are collected by user devices (e.g., the terminals 310-1 and 310-2) and the network entities (e.g., the base stations 320-1, 320-2 and/or 320-3). Also, the analysis server 340 may output the analyzed network information through a display means, etc. In the case of FIG. 3, the analysis server 340 and the network management server 330 have been illustrated as separate entities. However, in accordance with another exemplary embodiment of the present disclosure, the analysis server 340 and the network management server 330 may be configured as a single device.

For the sake of a network information analysis of the analysis server 340, the terminals 310-1 and 310-2 each may provide downlink channel information and location information to a serving base station (i.e., the base station 320-1 in FIG. 3). The downlink channel information includes a channel quality for each carrier, and includes channel qualities about neighboring base stations as well as the serving base station. The location information is data (e.g., global positioning system (GPS) values) dictating locations of the terminals 310-1 and 310-2 or includes measurement information required for determining the locations. In accordance with another exemplary embodiment of the present disclosure, the terminals 310-1 and 310-2 may provide only the channel information.

For the purpose of a network information analysis of the analysis server 340, the base stations 320-1, 320-2 and/or 320-3 may provide downlink channel information measured by a terminal (e.g., the terminal 1 310-1, the terminal 2 320-2, etc.), location information of the terminal, and/or load information of a cell, to the analysis server 340. The location information may be data dictating a location provided by the terminal or include location or timing advance (TA) information measured by the base stations 320-1, 320-2 and/or 320-3. A load of the cell may be expressed in various forms. For example, the load of the cell may be expressed as an access terminal count, a resource use rate, etc. In accordance with another exemplary embodiment of the present disclosure, the load information of the cell may be omitted.

For the purpose of a network information analysis of the analysis server 340, the network management server 330 provides configuration information. The configuration information includes at least one of configuration information on an antenna, configuration information on cells, and/or configuration information on a CA pairing relationship. For example, the configuration information on the antenna may include latitudes and longitudes of antennas, azimuth angles of the antennas, and/or tiling angles of the antennas. The configuration information on the cells may include locations of the cells. The configuration information on the CA pairing relationship may include information on a cell combination in which CA pairing is available. On the basis of the configuration information, the analysis server 340 may determine whether a specific cell has a CA pairing relationship with any other cells.

On the basis of data provided from the network management server 330 and the base stations 320-1, 320-2 and/or 320-3, the analysis server 340 may determine a CA coverage mismatch area. In other words, the analysis server 340 may analyze a success rate or failure rate of a CA service within a range in which terminals are located. For this, the analysis server 340 may operate as in FIG. 4 below.

Figure 4:
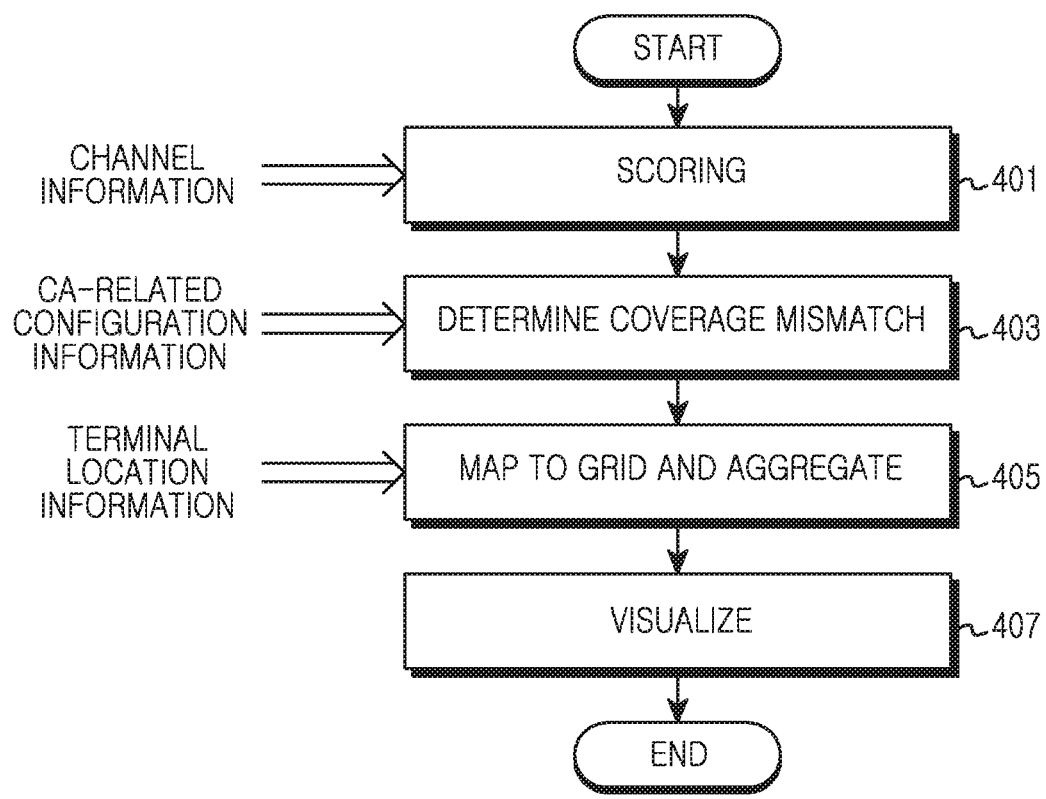
FIG. 4 illustrates a network analysis procedure in a wireless communication system according to an exemplary embodiment of the present disclosure.

FIG. 4 illustrates a network analysis procedure in a wireless communication system according to an exemplary embodiment of the present disclosure. FIG. 4 exemplifies a method for operating in the analysis server 340 of FIG. 3.

Referring to FIG. 4, in step 401, the analysis server performs scoring. In other words, the analysis server determines scores for each cell and carrier on the basis of channel information. In accordance with another exemplary embodiment of the present disclosure, the analysis server may determine the scores on the basis of the channel information and load information of cells. The score refers a metric for selecting candidates for determining whether CA pairing is available. The scoring may be performed when channel information on one terminal is received.

Next, the analysis server goes to step 403 to determine CA coverage mismatch. At this time, the analysis server determines the CA coverage mismatch on the basis of CA-related configuration information. Specifically, the analysis server may check whether candidates for CA pairing selected on the basis of the scores are available for CA pairing, thereby determining the CA coverage mismatch. That is, when being based on the configuration information, it may be determined that CA coverage mismatch not occur if the candidates are in a CA pairing relationship.

Thereafter, the analysis server proceeds to step 405 to map the determination result on the CA coverage mismatch to a grid, and aggregates. The analysis server may set a grid partitioning, by a constant size, a map showing a service region of a radio access network, and map the determination result on the CA coverage mismatch to each bin within the grid. For this, the analysis server determines a corresponding bin, in consideration of location information of a terminal that has provided channel information.

Next, the analysis server proceeds to step 407 to visualize information on the CA coverage mismatch. For example, the analysis server may display a CA coverage mismatch rate for each bin on an image of the map. For example, the analysis server may render a color or graphic pattern corresponding to the mismatch rate to a region of each bin or overlap the same, thereby displaying the CA coverage mismatch rate.

Figure 5:
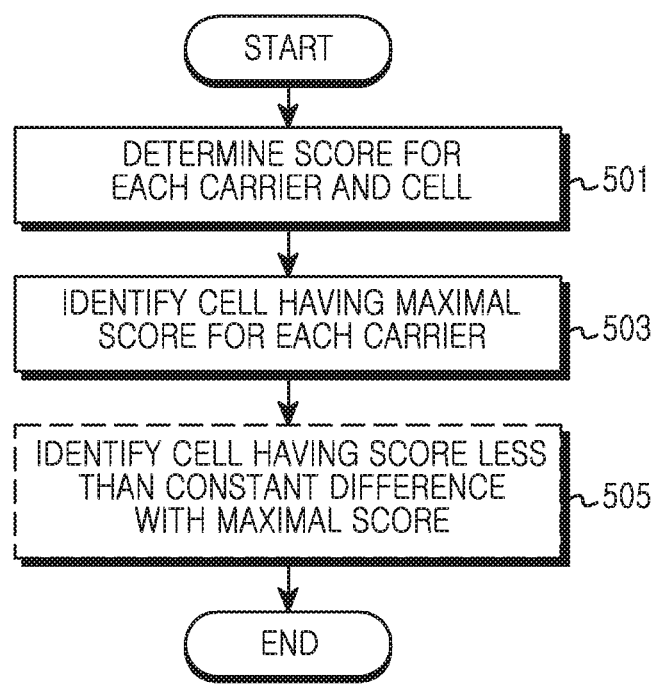
FIG. 5 illustrates a score evaluation procedure in a wireless communication system according to an exemplary embodiment of the present disclosure.

FIG. 5 illustrates a score evaluation procedure in a wireless communication system according to an exemplary embodiment of the present disclosure. FIG. 5 exemplifies a concrete method of the step 401 of FIG. 4.

Referring to FIG. 5, in step 501, the analysis server determines scores for each carrier and cell. The scores may be determined for one terminal, and may be determined on the basis of at least one of channel information and loads of cells. Here, the channel information may include reference signal received power (RSRP). The score determination scheme may become different according to a secondary cell (Scell) choice scheme of the terminal. For example, in case where the secondary cell is selected on the basis of a channel quality, the score may be determined on the basis of the channel information. For another example, in case where the secondary cell is selected on the basis of a channel quality and a load, the score may be determined on the basis of the channel information and the load. For example, in case where the score is determined on the basis of the channel information, the score may be determined as in <Equation 1> below.

$$S(f_x, c_y) = RSRP(f_x, c_y) \qquad \text{[Equation 1]}$$

In the <Equation 1>, the $S(f_x, c_y)$ denotes a score for a carrier (x) of a cell (y), and the $RSRP(f_x, c_y)$ denotes a channel quality for the carrier (x) of the cell (y). That is, the score may be defined as a channel quality. In accordance with another exemplary embodiment of the present disclosure, the score may be defined as a function for the channel quality.

For another example, in case where the score is determined on the basis of the channel information and the load, the score may be determined as in <Equation 2> below.

$$S(f_x, c_y) = g(RSRP(f_x, c_y), Load(f_x, c_y)) \qquad \text{[Equation 2]}$$

In the <Equation 2>, the $S(f_x, c_y)$ denotes a score for a carrier (x) of a cell (y), the $RSRP(f_x, c_y)$ denotes a channel quality for the carrier (x) of the cell (y), the $Load(f_x, c_y)$ denotes a load level of the carrier (x) of the cell (y), and the g( ) denotes a function of determining the score. That is, the score may be defined as a function for the channel quality. For example, the g( ) may be defined to increase the score as the channel quality increases. Also, the g( ) may be defined to increase the score as the load level decreases.

Thereafter, the analysis server proceeds to step 503 to identify a cell having a maximal score for each carrier. In other words, the analysis server selects candidates for determining whether CA is available. That is, one candidate is selected per carrier, and the candidate is a cell having the largest score at each carrier. For example, as illustrated in FIG. 6, the analysis server may identify a cell having a maximal score for each carrier. FIG. 6 illustrates a score matrix, and each row corresponds to a carrier, and each column corresponds to a cell. That is, as a candidate, a cell 2 has been selected at a carrier 1, and a cell 4 has been selected at a carrier 2, and a cell 3 has been selected at a carrier 3, and a cell 3 has been selected at a carrier 4, and a cell 1 has been selected at a carrier 5.

Next, the analysis server goes to step 505 to identify at least one cell having a score less than a constant difference with the maximal score for each carrier. In other words, the analysis server additionally selects candidates for determining whether CA is available. That is, a majority of candidates may be selected per carrier, and an additionally selected candidate is a cell in which a score difference with a cell having the largest score at each carrier is equal to or is less than a threshold value. For example, as illustrated in FIG. 7, the analysis server may identify candidates. FIG. 7 illustrates a score matrix, and each row corresponds to a carrier, and each column corresponds to a cell. Referring to FIG. 7, as a candidate, a cell 3 has been added at the carrier 1, and a cell 4 has been added at the carrier 3, and a cell 2 has been added at the carrier 4, and a cell 2 and a cell 3 have been added at the carrier 5.

In an exemplary embodiment illustrated in FIG. 5, at least one cell having a score less than a constant difference with a maximal score for each carrier is additionally selected. However, in accordance with another exemplary embodiment of the present disclosure, the step 505 may be omitted. That is, only cells having a maximal score for each carrier may be selected as candidates.

Figure 8:
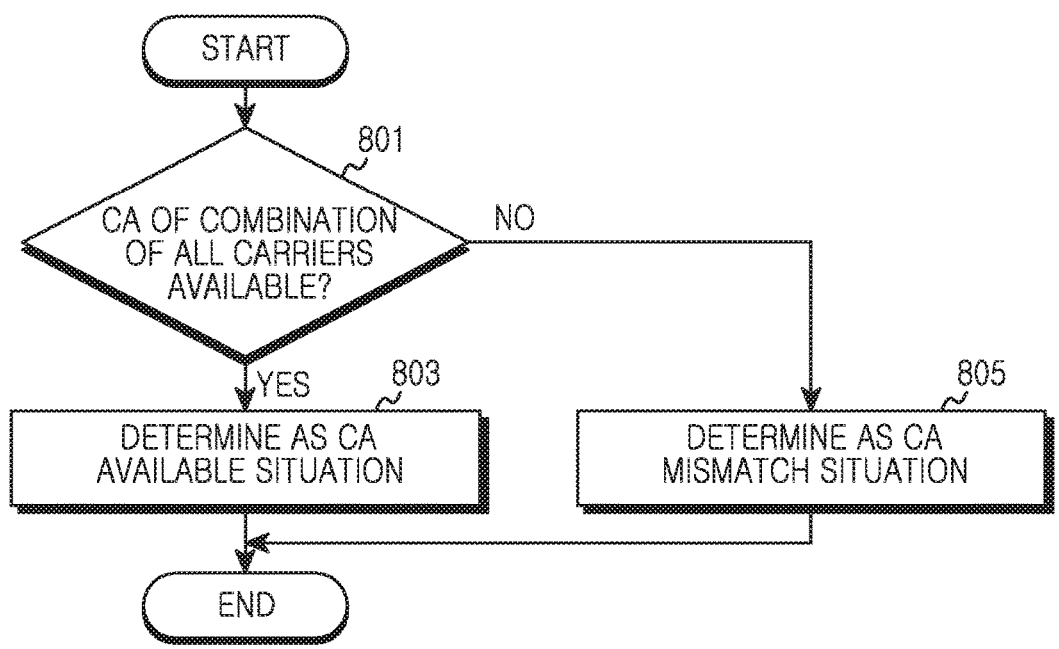
FIG. 8 illustrates a procedure of determining CA coverage mismatch in a wireless communication system according to an exemplary embodiment of the present disclosure.

FIG. 8 illustrates a procedure of determining CA coverage mismatch in a wireless communication system according to an exemplary embodiment of the present disclosure. FIG. 8 exemplifies a concrete method of the step 403 of FIG. 4.

Referring to FIG. 8, in step 801, the analysis server determines whether CA of a combination of all carriers is available. In case where only cells having a maximal score for each carrier are selected as candidates, the analysis server determines if the cells of the maximal score have a CA pairing relationship on the basis of CA configuration information. For example, when the candidates are selected as in FIG. 6, whether CA of the carrier 1 and the carrier 2 is available is dependent on whether the cell 2 and the cell 4 have a CA pairing relationship. And, whether CA of the carrier 1 and the carrier 3 is available is dependent on whether the cell 2 and the cell 3 have a CA pairing relationship. And, whether CA of the carrier 1 and the carrier 4 is available is dependent on whether the cell 2 and the cell 3 have a CA pairing relationship. And, whether CA of the carrier 1 and the carrier 5 is available is dependent on whether the cell 2 and the cell 1 have a CA pairing relationship. Similarly, it may be determined whether CA of even other carrier combinations is available according to a CA pairing relationship. Or, when a majority of cells are selected as candidates at one carrier, the analysis server determines that CA should be available if even one of the majority of cells has a CA pairing relationship. For example, when candidates are selected as in FIG. 7, the analysis server may determine that CA between the carrier 1 and the carrier 2 should be available, if at least one of a cell 2 and a cell 3 has a CA pairing relationship with a cell 4.

If the CA of the combination of the all carriers is available, the analysis server proceeds to step 803 to determine that it should be a CA available situation. In other words, the analysis server determines that there should not be CA coverage mismatch.

If the CA of the combination of the all carriers is not available, in other words, if CA of at least one combination is not available, the analysis server proceeds to step 805 to determine that it should be a CA mismatch situation. In other words, the analysis server determines that there should be CA coverage mismatch.

In an exemplary embodiment illustrated in FIG. 8, when CA of all carrier combinations is available, it is determined that there should not be CA coverage mismatch. But, in accordance with another exemplary embodiment of the present disclosure, when CA of any one combination among available carrier combinations is available, it may be determined that there should not be CA coverage mismatch. That is, a more relaxed CA coverage mismatch determination condition may be adopted. In this case, although the same data is used, a CA coverage mismatch rate decreases.

In an exemplary embodiment illustrated in FIG. 8, it is determined whether CA of all carrier combinations is available. However, in accordance with another exemplary embodiment of the present disclosure, it may be determined whether CA of only some carriers is available. That is, a network provider may grant a relatively higher importance to some carriers and in this case, whether CA of the carriers granted the higher importance is available may become a criterion of determining whether CA coverage mismatch occurs. For example, when considering only a carrier 1 and a carrier 2, if CA between the carrier 1 and the carrier 2 is available, it may be determined that there should not be CA coverage mismatch, irrespective of whether CA of another carrier combination is available.

Figure 9:
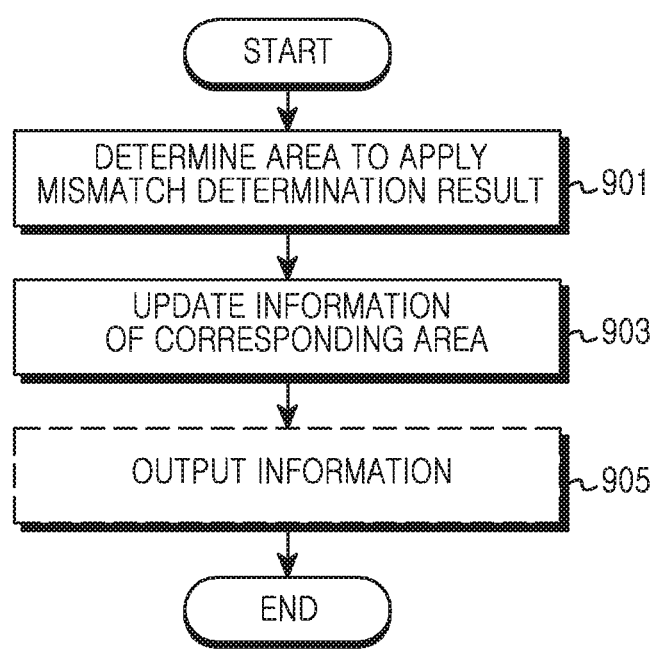
FIG. 9 illustrates a procedure of updating network information in a wireless communication system according to an exemplary embodiment of the present disclosure.

FIG. 9 illustrates a procedure of updating network information in a wireless communication system according to an exemplary embodiment of the present disclosure. FIG. 9 exemplifies a concrete method of the step 405 and the step 407 of FIG. 4.

Referring to FIG. 9, in step 901, an analysis server determines an area to apply a mismatch determination result. The area refers a geographical region dividing a service region of a radio access network. The area may correspond to a bin that is partitioned by a grid on a map. In other words, the analysis server determines whether a terminal, which has provided channel information being the basis of the mismatch determination result, is located in which area. For this, the analysis server may map a location coordinate of the terminal, i.e., latitude and longitude to a value indicating one bin. Specifically, the analysis server transforms the latitude and longitude into two real values in compliance with a predefined rule. For example, when latitude is 37° 15' 26.26" N(north) and longitude is 127° 03' 07.24" E(east), the analysis server may transform the same as in <Equation 3> below.

$$\text{Latitude: } 37 + \frac{15}{60} + \frac{26.26}{3600} = 37.2572944 \ldots \quad \text{[Equation 3]}$$

$$\text{Longitude: } 127 + \frac{03}{60} + \frac{07.24}{3600} = 127.0520111 \ldots$$

And, the analysis server scales and rounds up the real values corresponding to the latitude and the longitude. By this, the value indicating one bin is determined. For example, when the real values corresponding to the latitude and the longitude are given as in the <Equation 3>, the analysis server may determine the value indicating one bin as in <Equation 4> below.

$$B_y = \text{int}(\alpha \times 37.25729444 \ldots + 0.5)$$

$$B_x = \text{int}(\beta \times 127.0520111 \ldots + 0.5) \quad \text{[Equation 4]}$$

In the <Equation 4>, the $B_y$ denotes a y-axis index of a bin, the $B_x$ denotes an x-axis index of the bin, the $\alpha$ denotes a scaling factor for latitude, the $\beta\square$ denotes a scaling factor for longitude, and the int( ) denotes a function transforming to the most approximate integer.

The bin determination scheme exemplified in the <Equation 3> and the <Equation 4> may be applied when a location of a terminal is provided as latitude and longitude. However, although the location of the terminal is expressed in another form, the analysis server may transform the location into the latitude and longitude and thereafter, apply the scheme exemplified in the <Equation 3> and the <Equation 4>. Or, in accordance with another exemplary embodiment of the present disclosure, the analysis server may directly compare a coordinate of the terminal with a center coordinate of each bin or boundary coordinates of each bin, thereby determining a corresponding bin.

Next, the analysis server goes to step 903 to update information of a corresponding area. In other words, the analysis server updates a statistic value of CA coverage mismatch in the area, i.e., the bin, which has been determined in the step 901. Whether one CA coverage mismatch occurs is determined on the basis of one-time provision of channel quality of one terminal. Accordingly, when determination on whether new CA coverage mismatch occurs is achieved, the analysis server increases a count of a corresponding area by 1, and updates a CA coverage mismatch rate or a CA coverage mismatch count on the basis of the newly added determination result.

Figure 10:
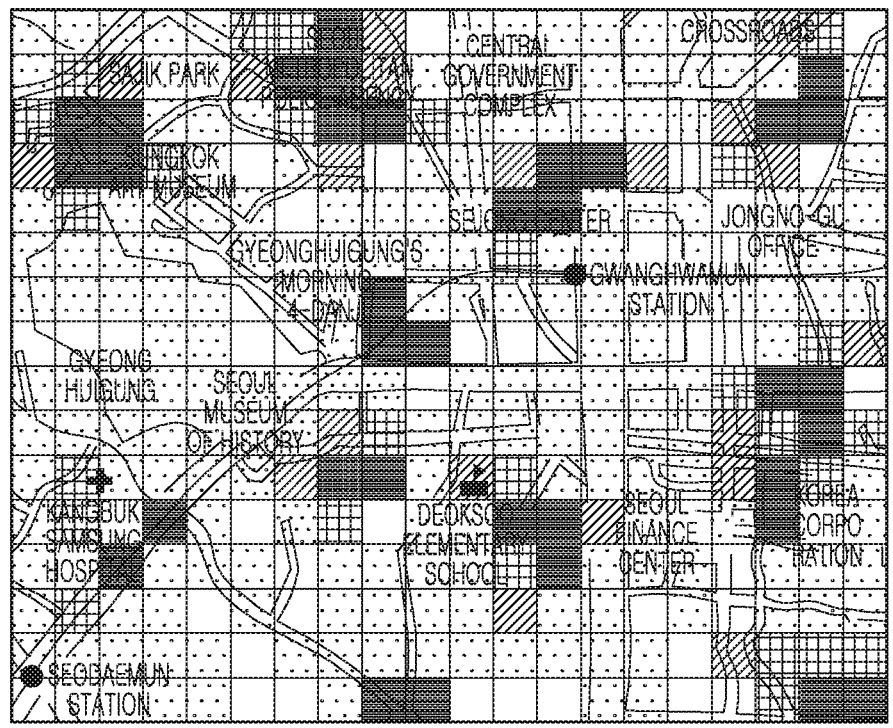
FIG. 10 illustrates an example of network information output in a wireless communication system according to an exemplary embodiment of the present disclosure.
Figure 10:
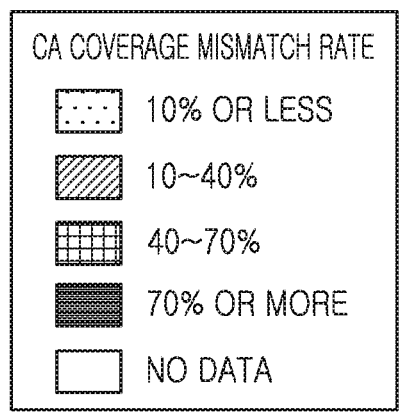

Thereafter, the analysis server goes to step 905 to output the updated information. The form of the output may become different according to an output means provided in the analysis server. For example, the output may have a form such as screen display using the display means, printing, a sound, a voice message, a vibration, etc. Or, the output may include signal sending through a wired channel or a wireless channel. In this case, an operator may receive the provision of the information in various forms through another device. For example, as in FIG. 10, the information may be outputted visually. Referring to FIG. 10, a map is displayed, and a majority of bins are partitioned by a grid on the map. And, each bin is rendered to a graphic pattern or color that shows a CA coverage mismatch rate. That is, the graphic pattern or color expressed in each bin displays CA coverage mismatch, i.e., whether CA is available and further, expresses a CA failure rate. Accordingly to this, the operator may intuitively recognize a CA coverage mismatch rate of each area.

Figure 11:
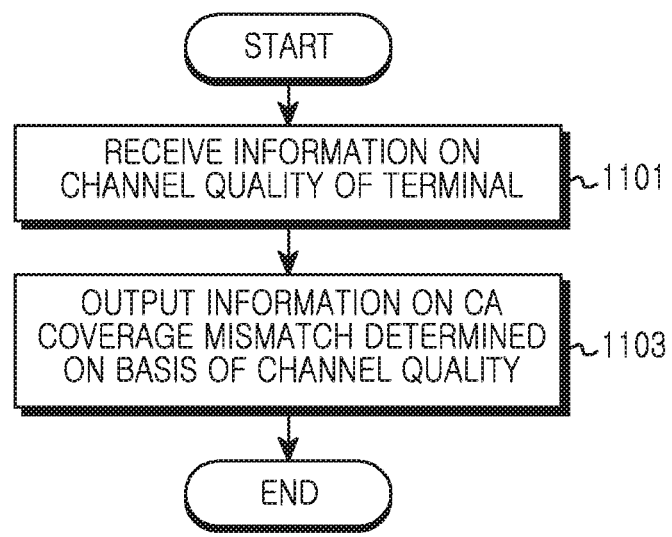
FIG. 11 illustrates an operation procedure of an analysis device in a wireless communication system according to an exemplary embodiment of the present disclosure.

FIG. 11 illustrates an operation procedure of an analysis device in a wireless communication system according to an exemplary embodiment of the present disclosure.

Referring to FIG. 11, in step 1101, the analysis device receives information on channel quality of the terminal. Here, the information on the channel quality includes channel qualities for each cell and carrier. Also, the analysis device may further receive location information of the terminal. Also, the analysis device may further receive information on whether a backhaul requirement for CA between all cells within a radio access network is satisfied.

Next, the analysis device proceeds to step 1103 to output information on CA coverage mismatch, which has been determined on the basis of the channel quality. In other words, the analysis device outputs information on CA coverage mismatch at a location where the channel quality received in the step 1101 has been measured. The information on whether the CA coverage mismatch occurs may include an occurrence rate of the CA coverage mismatch at the location. For example, as in FIG. 10 above, the information may be outputted visually. That is, the analysis device may map location information of the terminal to a value indicating one area partitioned on a map, and display the map partitioned into a majority of areas that have been rendered to a graphic pattern or color showing the occurrence rate of the CA coverage mismatch. At this time, if one area is selected by the operator, the analysis device may display a character or number indicating an occurrence rate of CA coverage mismatch of the selected area. In accordance with another exemplary embodiment of the present disclosure, the information on the CA coverage mismatch may be outputted in other forms than one through a display means. For example, the information on the CA coverage mismatch may be outputted in the form of matter printing, a sound, a voice message, a vibration, etc. Or, the information on the CA coverage mismatch may be outputted in the form of signal sending through a wired channel or a wireless channel.

Although not illustrated in FIG. 11, prior to displaying the information on the CA coverage mismatch, the analysis device may determine whether the CA coverage mismatch occurs on the basis of the information on the channel quality and CA-related configuration information. For this, the analysis device determines indexes for each carrier and cell on the basis of the channel quality and loads of cells, and determines at least one candidate cell for each carrier on the basis of the indexes, and then determines whether CA is available on the basis of whether a backhaul requirement for CA between the candidate cells is satisfied. Here, the index is determined on the basis of at least one of the channel quality or the cell load. Also, the at least one candidate cell may include one cell having a maximal index at each carrier and further to this, may further include at least one cell having an index having a difference of a threshold value or less with the maximal index at the each carrier.

And, the analysis device may determine that the CA be available if a backhaul requirement for CA between candidate cells is satisfied for all combinations of carriers. In accordance with another exemplary embodiment of the present disclosure, the analysis device may determine that the CA be available if a backhaul requirement for CA between candidate cells is satisfied for all combinations of designated some carriers. In accordance with a further exemplary embodiment of the present disclosure, the analysis device may determine that the CA be available if a backhaul requirement for CA between candidate cells is satisfied for at least one of the all combinations of the carriers.

Figure 12:
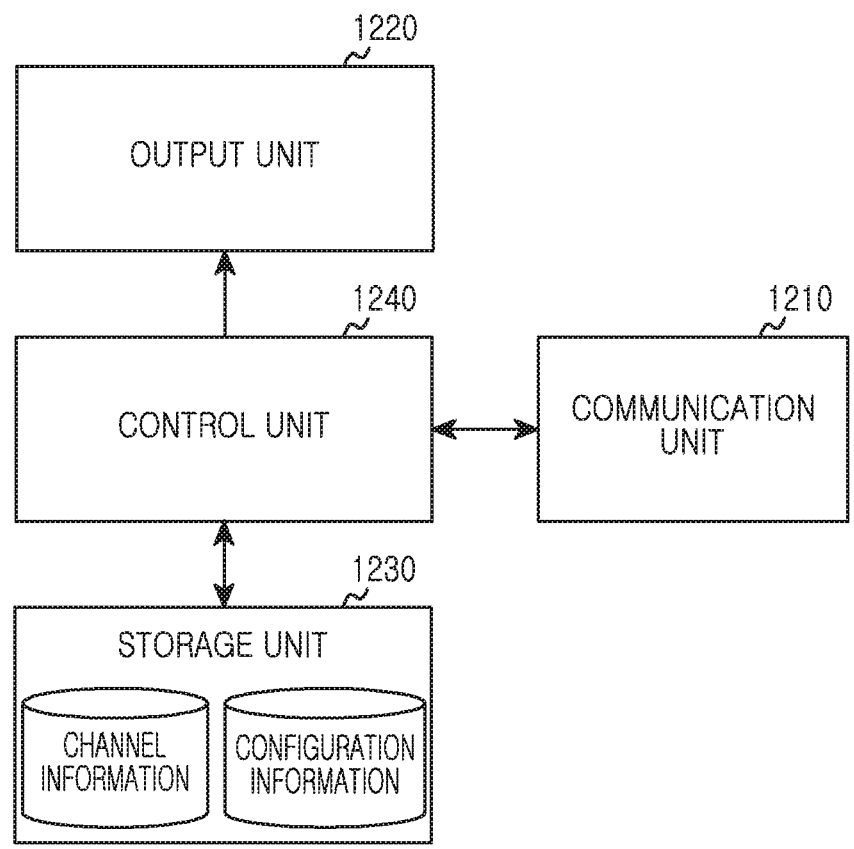
FIG. 12 illustrates a block construction of an analysis device in a wireless communication system according to an exemplary embodiment of the present disclosure.

FIG. 12 illustrates a block construction of an analysis device in a wireless communication system according to an exemplary embodiment of the present disclosure. FIG. 12 exemplifies a construction of the analysis server 340 of FIG. 3.

Referring to FIG. 12, the analysis device includes a communication unit 1210, an output unit 1220, a storage unit 1230, and/or a control unit 1240.

The communication unit 1210 provides a function for performing, by the analysis device, communication with another device. For example, the communication unit 1210 may perform a function for performing communication with another device, which has been connected through a channel, through wireless communication or wired communication. Specifically, the communication unit 1210 may receive a signal from a base station or network management server that has been connected to a radio access network. In accordance with an exemplary embodiment of the present disclosure, the communication unit 1210 may receive information on a channel quality of a terminal and/or location information of the terminal, from the base station. Also, the communication unit 1210 may further receive information on whether a backhaul requirement for CA between all cells within the radio access network is satisfied, from the network management server. The communication unit 1210 sends and receives a signal and therefore, may be denoted as a 'transmitter', a 'receiver', a 'transmitter and/or receiver' and the like.

The output unit 1220 outputs information. Particularly, in accordance with an exemplary embodiment of the present disclosure, the output unit 1220 outputs information on CA coverage mismatch. A concrete form of the output unit 1220 may become different according to a concrete exemplary embodiment. For example, the output unit 1220 may include at least one of a display window providing visual information, an LED, a speaker providing auditory information, and/or a vibration-available module. Accordingly to this, the output unit 1220 may output information in the form of at least one of an image, a character, a number, a sound, light emitting, lighting, and/or a vibration. Also, to provide the information to another device in the form of a signal, the output unit 1220 may provide a communication interface different from the communication unit 1210, or include a port for connection with an external device. For example, the different communication interface may comply with a short-range communication standard such as a wireless local area network (wireless LAN), Bluetooth, Zigbee, etc.

The storage unit 1230 stores data such as a basic program for an operation of the analysis device, an application program, setting information, etc. Particularly, the storage unit 1230 stores information on channel quality measured by a terminal, and/or configuration information. Here, the channel information, the information on the channel quality includes channel qualities for each cell and carrier. The configuration information includes information on whether a backhaul requirement for CA between all cells is satisfied. The storage unit 1230 may further store location information of terminals. The storage unit 1230 provides stored data in response to a request of the control unit 1240.

The control unit 1240 controls general operations of the analysis device. For example, the control unit 1240 transmits and/or receives a signal through the communication unit 1210. Also, the control unit 1240 executes a program stored in the storage unit 1230, and records data in the storage unit 1230, and reads the same. For this, the control unit 1240 may include at least one processor. In accordance with an exemplary embodiment of the present disclosure, the control unit 1240 determines whether CA coverage mismatch occurs within a service region on the basis of the information on the channel quality stored in the storage unit 1230, the configuration information, and/or the location information of the terminals, and outputs information on the CA coverage mismatch through the output unit 1220. For example, the control unit 1240 may control the analysis device to operate like the analysis server 340 of FIG. 3, or perform a procedure of FIG. 4, FIG. 5, FIG. 8, FIG. 9 or FIG. 11. An operation of the control unit 1240 according to an exemplary embodiment of the present disclosure is given as follows.

In accordance with one exemplary embodiment of the present disclosure, the control unit 1240 may determine whether the CA coverage mismatch occurs on the basis of the information on the channel quality and CA-related configuration information. For the sake of this, the control unit 1240 determines indexes for each carrier and cell on the basis of the channel quality and loads of cells, and determines at least one candidate cell for each carrier on the basis of the indexes and thereafter, determines whether CA is available on the basis of whether a backhaul requirement for CA between the candidate cells is satisfied. Here, the index is determined on the basis of at least one of the channel quality or the cell load. Also, the at least one candidate cell may include one cell having a maximal index at each carrier and further to this, may further include at least one cell having an index having a difference of a threshold value or less with the maximal index at the each carrier.

And, the control unit 1240 may determine that the CA should be available if a backhaul requirement for CA between candidate cells is satisfied for all combinations of carriers. In accordance with another exemplary embodiment of the present disclosure, the control unit 1240 may determine that the CA should be available if a backhaul requirement for CA between candidate cells is satisfied for all combinations of designated some carriers. In accordance with a further exemplary embodiment of the present disclosure, the control unit 1240 may determine that the CA should be available if a backhaul requirement for CA between candidate cells is satisfied for at least one of the all combinations of the carriers.

Thereafter, the control unit 1240 may output, through the output unit 1220, the information on the CA coverage mismatch, which has been determined as described above. In other words, the control unit 1240 outputs the information on the CA coverage mismatch at a location where the channel quality has been measured. The information on whether the CA coverage mismatch occurs may include an occurrence rate of the CA coverage mismatch at the location. For example, the control unit 1240 may map location information of the terminal to a value indicating one area partitioned on a map, and display the map partitioned into a majority of areas that have been rendered to a graphic pattern or color showing the occurrence rate of the CA coverage mismatch. At this time, if one area is selected by an operator, the control unit 1240 may display a character or number indicating an occurrence rate of CA coverage mismatch of the selected area.

Methods according to exemplary embodiments mentioned in claims or specification of the present disclosure may be implemented in the form of hardware, software, or a combination of hardware and software.

In the case of being implemented by software, a computer-readable storage medium storing one or more programs (i.e., software modules) may be provided. The one or more programs stored in the computer-readable storage medium are configured to be executable by one or more processors within an electronic device. The one or more programs include instructions for enabling the electronic device to execute the methods according to the exemplary embodiments stated in the claims or specification of the present disclosure.

This program (i.e., software module and/or software) may be stored in a random access memory (RAM), a non-volatile memory including a flash memory, a read only memory (ROM), an electrically erasable programmable read only memory (EEPROM), a magnetic disc storage device, a compact disc-ROM (CD-ROM), digital versatile discs (DVDs) or an optical storage device of another form, and a magnetic cassette. Or, it may be stored in a memory that is constructed in combination of some or all of them. Also, each constructed memory may be included in plural as well.

Also, the program may be stored in an attachable storage device that may access through a communication network such as the Internet, an intranet, a local area network (LAN), a wireless LAN (WLAN) or a storage area network (SAN), or a communication network constructed in combination of them. This storage device may connect to a device performing an exemplary embodiment of the present disclosure through an external port. Also, a separate storage device on the communication network may connect to the device performing the exemplary embodiment of the present disclosure as well.

In the aforementioned concrete exemplary embodiments of the present disclosure, constituent elements included in the disclosure have been expressed in the singular form or plural form in accordance to a proposed concrete exemplary embodiment. However, the expression of the singular form or plural form is, for description convenience, selected suitable to a proposed situation, and the present disclosure is not limited to singular or plural constituent elements, and even a constituent element expressed in the plural form may be constructed in the singular form, or even a constituent element expressed in the singular form may be constructed in the plural form.

While a concrete exemplary embodiment has been described in a detailed description of the present disclosure, it is undoubted that various modifications can be made without departing from the scope of the present disclosure. Therefore, the scope of the present disclosure should not be defined to be limited to the described exemplary embodiment and should be defined by not only claims mentioned later but also equivalents to these claims.

What is claimed is:

1. A method for network information analysis in a wireless communication system, the method comprising:
   receiving information on channel quality for each carrier measured by a terminal and information on whether cells in the wireless communication system are connected through a backhaul;
   determining at least one candidate cell for each carrier from among the cells in the wireless communication system based on the channel quality;
   determining whether carrier aggregation (CA) is available based on the determining of at least one candidate cell for each carrier from among the cells and a backhaul requirement for CA between candidate cells is satisfied for all combinations of carriers; and
   displaying information regarding whether the CA is available at a location where the channel quality has been measured,
   wherein the information on the channel quality comprises channel qualities for each cell and carrier, and
   wherein the information regarding whether the CA is available comprises an occurrence rate of the CA coverage mismatch at the location.

2. The method of claim 1, further comprising:
   determining metrics for each carrier and cell on the basis of the information on the channel quality and loads of cells.

3. The method of claim 1, further comprising:
   receiving location information of the terminal; and
   mapping the location information of the terminal to a value indicating one area that has been partitioned on a map.

4. The method of claim 1, wherein the displaying the information regarding whether the CA is available comprises displaying a map partitioned into a majority of areas having been rendered to a graphic pattern or color indicating an occurrence rate of a situation where the CA is not available.

5. The method of claim 2,
   wherein the at least one candidate cell for each carrier is determined on the basis of the metrics, and wherein the method further comprises on the basis of whether a backhaul requirement for CA between the candidate cells is satisfied, determining whether the CA is available.

6. The method of claim 4, wherein the displaying the information regarding whether the CA is available comprises, if one area is selected, displaying a character or number indicating an occurrence rate of a situation where the CA is not available at the selected area.

7. The method of claim 5, wherein the determining the at least one candidate cell for each carrier comprises selecting, as one candidate cell, one cell having a maximal metric at each carrier.

8. The method of claim 5, wherein the determining whether the CA is available comprises determining that the CA should be available if a backhaul requirement for CA between candidate cells is satisfied for all combinations of carriers.

9. An apparatus for network information analysis in a wireless communication system, the apparatus comprising:
at least one transceiver configured to receive information on channel quality for each carrier measured by a terminal and information on whether cells in the wireless communication system are connected through a backhaul; and
at least one processor configured to:
determine at least one candidate cell for each carrier from among the cells in the wireless communication system based on the channel quality,
determine whether carrier aggregation (CA) coverage is available based on the determining of at least one candidate cell for each carrier from among the cells and a backhaul requirement for CA between candidate cells is satisfied for all combinations of carriers, and
control to display information regarding whether the CA is available at a location where the channel quality has been measured,
wherein the information on the channel quality comprises channel qualities for each cell and carrier, and
wherein the information on whether the CA is available comprises an occurrence rate of a situation where the CA is not available at the location.

10. The apparatus of claim 9, wherein the at least one processor is further configured to:
determine metrics for each carrier and cell on the basis of the information on the channel quality and loads of cells.

11. The apparatus of claim 9, wherein the at least one transceiver is further configured to receive location information of the terminal, and
wherein the at least one processor is further configured to map the location information of the terminal to a value indicating one area that has been partitioned on a map.

12. The apparatus of claim 9, wherein the at least one processor is further configured to:
control to display a map partitioned into a majority of areas having been rendered to a graphic pattern or color indicating an occurrence rate of a situation where the CA is not available.

13. The apparatus of claim 10,
wherein the at least one candidate cell for each carrier is determined on the basis of the metrics, and
wherein the at least one processor is further configured to: determine whether the CA is available, on the basis of whether a backhaul requirement for CA between the candidate cells is satisfied.

14. The apparatus of claim 12, wherein the at least one processor is further configured to:
control to display, if one area is selected, a character or number indicating an occurrence rate of a situation where the CA is not available at the selected area.

15. The apparatus of claim 13, wherein the at least one processor is further configured to:
select, as one candidate cell, one cell having a maximal metric at each carrier.

16. The apparatus of claim 13, wherein the at least one processor is further configured to:
determine that the CA should be available if a backhaul requirement for CA between candidate cells is satisfied for all combinations of carriers.

* * * * *